United States Patent [19]

Ransom et al.

[11] Patent Number: 5,593,110
[45] Date of Patent: Jan. 14, 1997

[54] APPARATUS FOR CONTROLLING THE STRUCTURAL DYNAMIC RESPONSE OF A ROCKET

[75] Inventors: Stephen Ransom, Stuhr; Klaus-Dieter Relotius, Bremen, both of Germany

[73] Assignee: Daimler-Benz Aerospace AG, Munich, Germany

[21] Appl. No.: 302,809
[22] PCT Filed: Jan. 13, 1994
[86] PCT No.: PCT/DE94/00025
    § 371 Date: Dec. 8, 1994
    § 102(e) Date: Dec. 8, 1994
[87] PCT Pub. No.: WO94/16286
    PCT Pub. Date: Jul. 21, 1994

[30] Foreign Application Priority Data

Jan. 14, 1993 [DE] Germany ............ 43 00 761.9

[51] Int. Cl.⁶ .................................... F42B 10/02
[52] U.S. Cl. ................ 244/3.23; 244/3.24; 102/348
[58] Field of Search .................... 244/3.23, 3.24, 244/3.21, 3.22; 114/21.1, 23; 102/347, 348

[56] References Cited

U.S. PATENT DOCUMENTS

| | | |
|---|---|---|
| 3,000,597 | 9/1961 | Bell et al. . |
| 3,233,848 | 2/1966 | Byrne ................................. 244/3.21 |
| 3,464,649 | 9/1969 | Schreiner, Jr. . |
| 3,568,954 | 3/1971 | McCorkle, Jr. ................... 244/3.22 |
| 3,636,877 | 1/1972 | Eaton, Jr. . |
| 3,708,139 | 1/1973 | Wheeler ............................ 244/3.21 |
| 3,945,588 | 3/1976 | Maglio, Jr. . |
| 4,023,749 | 5/1977 | McCorkle, Jr. ................... 244/3.22 |
| 4,364,530 | 12/1982 | Ripley-Lotee et al. ........... 244/3.22 |
| 4,913,379 | 4/1990 | Kubota et al. ..................... 244/3.22 |

FOREIGN PATENT DOCUMENTS

| | | |
|---|---|---|
| 3918701 | 12/1990 | Germany . |
| 161296 | 6/1990 | Japan ................................. 244/3.21 |
| 161299 | 6/1990 | Japan ................................. 244/3.21 |
| 982779 | 2/1965 | United Kingdom . |

Primary Examiner—Michael J. Carone
Assistant Examiner—Theresa M. Wesson
Attorney, Agent, or Firm—W. G. Fasse; W. F. Fasse

[57] ABSTRACT

The arrangement serves to control the structural dynamic response characteristic of a booster rocket, which is provided with a propulsion engine as well as a payload. The booster rocket includes at least one control unit as well as at least one control element for altering a flight path perpendicularly to a lengthwise axis of the rocket. The control element is embodied as a rotatably supported control fin, arranged at a lateral side area of the booster rocket. Sensors are provided to measure lateral wind loads. An adjustment element is connected to the control fin and is adjusted by the control unit in such a manner that measured values provided by the wind sensors are converted into position adjustments of the control fin for compensating crosswise forces.

17 Claims, 2 Drawing Sheets

APPARATUS FOR CONTROLLING THE STRUCTURAL DYNAMIC RESPONSE OF A ROCKET

FIELD OF THE INVENTION

The invention relates to an arrangement for controlling the structural dynamic response characteristic of the body of a booster rocket, which is provided with a propulsion engine as well as an useful payload, and which comprises at least one control unit and at least one controlling element for changing the flight path of the booster rocket perpendicularly to a lengthwise axis of the rocket.

BACKGROUND INFORMATION

It is known, that in the operation of booster rockets, crosswise loads arise due to wind gusts during the ascent in the region of the atmosphere. These additional forces are transmitted into the structure of the rocket and are very difficult to calculate in advance. Therefore, it is necessary to provide a safety factor, which is taken into account in designing the structure of the booster rocket. When a rocket constructed in such a manner is employed, care must be taken that the maximum allowable wind velocity is less than the assumed, possibly arising wind speed that was taken into account during the construction, in order to ensure a sufficiently large safety margin for avoiding damage. If a higher wind velocity exists, then a launch is not possible. Since, however, the number of launch opportunities is also limited by many additional factors, the availability of the booster rocket can be considerably reduced by its sensitivity to the occurrence of wind gusts.

Thus, due to the wind sensitivity, on the one hand the number of possible launch times is reduced, and on the other hand the structure of the rocket must be sufficiently strongly built to be able to take up and carry crosswise forces within the allowable range. This results in an increase of the mass of the booster rocket, which has as a result a reduction in the maximum carriable payload for the same propulsion power.

OBJECT OF THE INVENTION

Therefore, it is the object of the present invention to construct a device for alleviating the effects of wind gusts as mentioned in the above introduction.

SUMMARY OF THE INVENTION

This object is achieved according to the invention in that the controlling element is embodied as a rotatably supported control fin that is arranged at a lateral side area of the booster rocket, and in that an adjustment element is connected to the control fin and is actuated by the control unit in such manner that measured values provided by sensors and relating to the lateral wind loads are converted into position adjustments of the control fin for compensating crosswise forces.

Because of these control surfaces, it is possible to actively regulate the rocket depending upon the current arising wind gusts. The sensors provide a possibility of measuring the effect of wind gusts on the rocket during its flight. Based on the detected measured values, the regulation system can prescribe the respectively necessary deflections of the control surfaces in order thereby to counteract the forces developed by the wind gusts. This provides a wind gust reduction system for rockets.

By means of the control surfaces, the crosswise forces that arise due to the arising mass accelerations and mass decelerations are reduced or, in the ideal case, compensated by the corresponding appropriate introduction of counterforces.

Moreover, for applications in the field of rockets that do not have a separate thrust vector steering control, it is possible to carry out a steering control of the flight path by means of the control fins, in order to influence the flight attitude of the rocket depending on the respective mission requirements, and thereby to ensure that a predefined flight path is followed. Additional sensors, which are connected to the regulating system, are used for regulating the flight attitude and flight path.

An application is also possible with other booster or carrier systems in order to achieve an active steering control of the payload while carrying out a mission. As a result of this, a realizable mission duration can be increased and a reentry into denser layers of the atmosphere can be directly controlled.

A combination of an advantageous aerodynamic form together with a sufficient strength or stability for introducing forces into the booster rocket is provided in that the control fin has an essentially triangular shape and tapers radially outwardly relative to the lengthwise axis, beginning from a base side facing the booster rocket. However, it is also possible, for example, to provide a rectangular shaped embodiment with or without sweepback.

A further improvement of the functionality can be achieved in that the control fin has a clipped or flattened portion in the area of its extending end directed away from the booster rocket.

The possibility of providing control for compensating wind gusts effective from different directions is provided in that four control fins are arranged substantially equally distant from one another along a circumference of the booster rocket.

To achieve an arrangement having a small number of controlling elements, so that especially the areas of the booster rocket affected by crosswise forces can be relieved of loads, it is suggested that the control fin of a multi-stage booster rocket is arranged in the area of a transition of a second stage into a third stage.

An especially advantageous arrangement for a multi-stage rocket is achieved in that the control fin is arranged in the area of an interstage fairing that encloses the transition of the second stage into the third stage.

In order to ensure a high effectiveness, it is suggested that the control arrangement is provided with two superimposed regulation or control loops.

The exact maintenance of a prescribed positioning of the control fin can be achieved in that the inner loop is formed by the control fin, the adjustment element, the control, and a position sensor.

In order to achieve a high quality compensation of the incident effective crosswise forces, it is provided that the outer loop comprises sensors for detecting the lateral wind influence, a control for wind gust reduction, as well as a nominal value generator.

BRIEF FIGURE DESCRIPTION

Example embodiments of the invention are schematically shown in the drawings, wherein.

DETAILED DESCRIPTION OF PREFERRED EXAMPLE EMBODIMENTS AND OF THE BEST MODE OF THE INVENTION

The arrangement for controlling the structural dynamic response characteristic of a booster rocket (1) essentially consists of control fins (2), which are arranged in a lateral side area (3) of the booster rocket (1).

Figure 1:
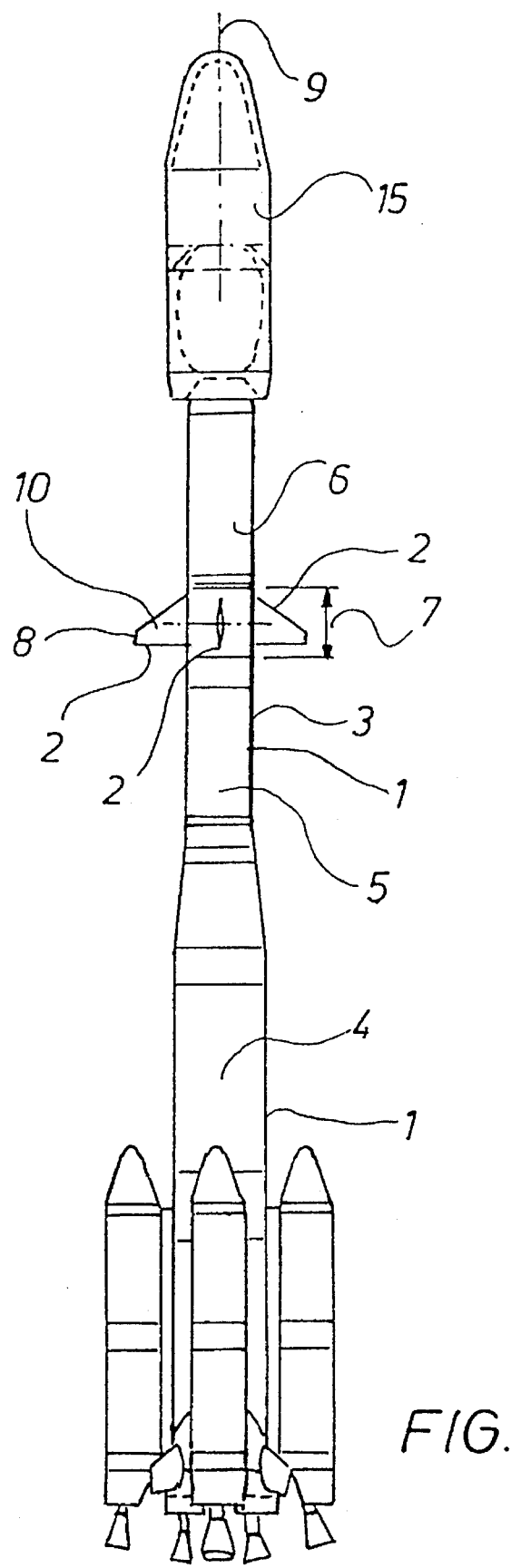
FIG. 1 is a side view of a booster rocket equipped with control fins.

In the example embodiment shown in FIG. 1, the booster rocket (1) is made up of a first stage (4), a second stage (5), a third stage (6), as well as a payload (15). A transition of the second stage (5) to the third stage (6) is provided with an interstage fairing (7). Four control fins (2) are arranged in the area of this interstage fairing (7). The four guide fins (2) are uniformly distributed around the circumference of the interstage fairing (7), whereby they respectively span an angle of about 90° between one another.

The control fins (2) comprise an approximately triangular shaped contour. Beginning from a base side directed toward the booster rocket (1), the control fins (2) are tapered in an outward direction. A particular embodiment includes a clipped or flattened portion (8) at the outer end or tip of the control fins (2) directed away from the booster rocket (1). A An edge of the control fins (2) facing the first stage (4), i.e. a trailing edge, extends substantially perpendicularly to a lengthwise axis (9) of the booster rocket (1). An edge facing the third stage, i.e. a leading edge, extends at an angle relative to the lengthwise axis (9) and transitions, at its end facing away from the booster rocket (1), through the clipped or flattened portion (8) into the trailing edge.

The control fins (2) are rotatably connected to the booster rocket (1). The control fins (2) are oriented in such a manner that control surfaces (10) comprise only a very small air resistance relative to an airstream oriented in the direction of the lengthwise axis (9).

Figure 2:
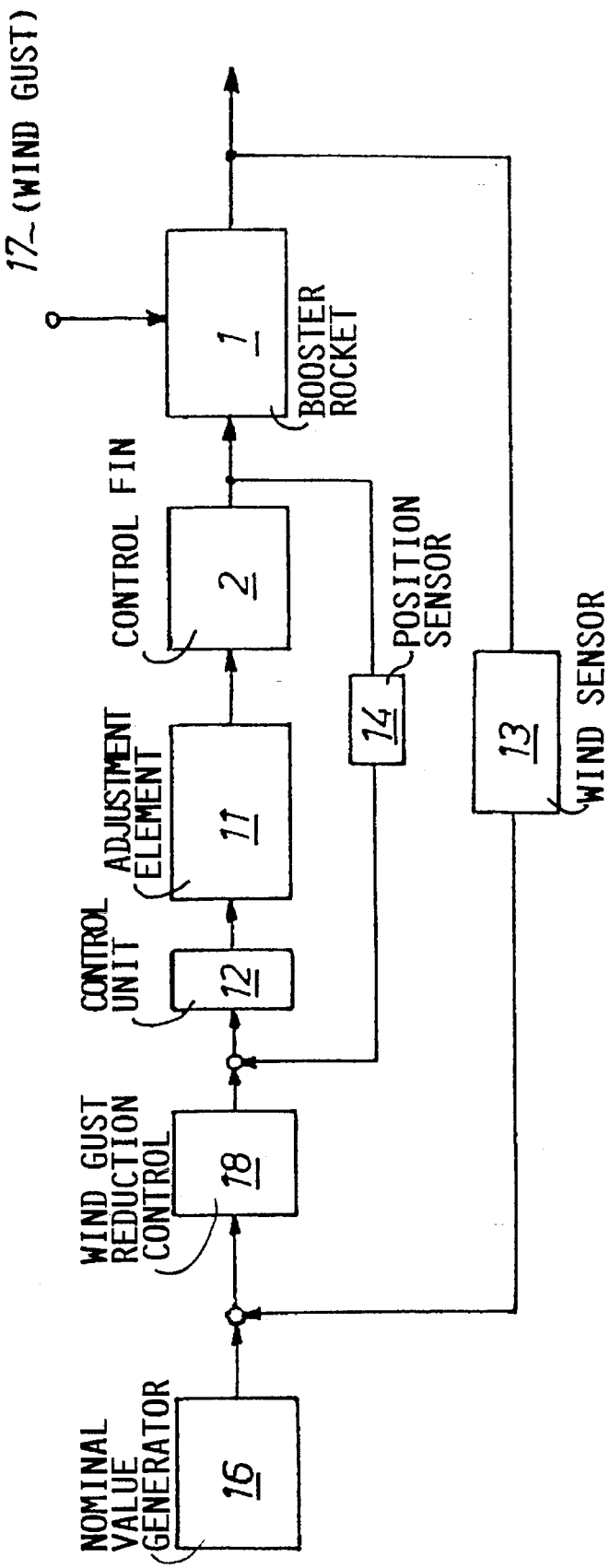
FIG. 2 is a block circuit diagram illustrating the essential functional components.

The circuit arrangement combination of the essential functional components is shown in FIG. 2. The control fin (2) is connected to an adjustment element (11). A control (12) controls the function of the adjustment element (11). The control (12) evaluates measured signals provided by sensors (13) for detecting lateral wind influences on the booster rocket (1). In order to provide a closed control loop, a position sensor (14) is arranged in the area of the control fin (2). The position sensor (14) is similarly connected to the control (12). Additional sensors can also be used in order to improve the efficiency of the control system.

In order to make it possible to counteract interfering influences, it is especially provided that the control (12) is equipped with two superimposed regulation or control loops. Thereby, it is especially intended to realize a cascade type regulation structure with an inner control loop and an outer control loop.

The inner control loop consists of the control fin (2), the adjustment element (11), the control (12), as well as the position sensor (14). This control loop serves to control the position of the control fin (2).

The outer control loop supplements the inner control loop with the sensors (13) for detecting lateral wind influences, a control (18) for wind gust reduction, as well as a nominal value generator (16). The two control loops are effective on the rocket (1) which is influenced by wind gusts (17). In other words, dependent on the signals provided by the wind gust sensors (13) and the position sensor (14), the adjustment element (11) positions the respective control fins (2) to counteract the influence of wind gusts. Although the invention has been described with reference to specific example embodiments, it will be appreciated that it is intended to cover all modifications and equivalents within the scope of the appended claims.

What we claim is:

1. An apparatus for controlling the structural dynamic response characteristic of a multi-stage booster rocket that has a plurality of stages and a lengthwise axis, the apparatus comprising a control fin that is arranged at a lateral side of said rocket at the area of a transition between said stages and that is supported rotatably relative to said rocket for altering the structural dynamic response of said rocket, an adjustment element connected to said control fin, a sensor for measuring lateral wind loads and providing corresponding measured values, and a control for evaluating said measured values and activating said adjustment element to adjust a position of said control fin so as to compensate for crosswise forces effective on said rocket perpendicularly to said lengthwise axis.

2. The apparatus of claim 1, having a total of four of said control fins arranged substantially equidistant from one another around a circumference of said booster rocket.

3. The apparatus of claim 1, wherein said rocket has first, second and third stages, and wherein said control fin is arranged at the area of a transition between said second stage and said third stage.

4. The apparatus of claim 3, wherein said rocket includes an interstage fairing enclosing said transition between said second stage and said third stage, and wherein said control fin is arranged on said interstage fairing.

5. The apparatus of claim 1, wherein said control comprises two superimposed control loops.

6. The apparatus of claim 5, further comprising a position sensor for sensing said position of said control fin, and wherein an inner loop of said two control loops comprises said control fin, said adjustment element, said control, and said position sensor.

7. The apparatus of claim 5, further comprising a second control for reducing wind gusts, and a nominal value generator, and wherein an outer loop of said two control loops comprises said sensor, said second control and said nominal value generator.

8. The apparatus of claim 1, wherein said rocket includes an interstage fairing enclosing said transition between said stages, and wherein said control fin is arranged on said interstage fairing.

9. An apparatus for controlling the structural dynamic response characteristic of a booster rocket which has a lengthwise axis, the apparatus comprising a control fin arranged at a lateral side of said rocket and supported rotatably relative to said rocket for altering the structural dynamic response of said rocket, an adjustment element connected to said control fin, a sensor for measuring lateral wind loads and providing corresponding measured values, and a control for evaluating said measured values and activating said adjustment element to adjust a position of said control fin so as to compensate for crosswise forces effective on said rocket perpendicularly to said lengthwise axis, wherein said control comprises a part of two superimposed control loops.

10. The apparatus of claim 9, further comprising a position sensor for sensing said position of said control fin, and wherein an inner loop of said two control loops comprises said control fin, said adjustment element, said control, and said position sensor.

11. The apparatus of claim 9, further comprising a second control for reducing wind gusts, and a nominal value generator, and wherein an outer loop of said two control loops comprises said sensor, said second control and said nominal value generator.

12. An apparatus for compensating crosswind forces effective on a booster rocket perpendicularly to a lengthwise axis of said rocket, said apparatus comprising a plurality of control fins arranged at a lateral outer surface of said rocket and supported rotatably relative to said rocket, a fin attitude adjustment mechanism connected to said control fins, a control unit with a signal output connected to said adjustment mechanism, and a crosswind sensor arranged on said rocket and having a signal output connected at least indirectly to a signal input of said control unit, wherein said control fins, said adjustment mechanism, said control unit and said crosswind sensor form two superimposed feedback control loops.

13. The apparatus of claim 12, further comprising a fin position sensor that is arranged to sense a respective attitude position of said control fins and that has a signal output connected to a signal input of said control unit to form an inner loop of said two superimposed feedback control loops, wherein said inner loop includes said control fins, said adjustment mechanism, said control unit and said position sensor.

14. The apparatus of claim 12, further comprising a wind gust reduction control interposed between said signal output of said wind sensor and said signal input of said control unit to form an outer loop of said two superimposed feedbacks control loops, wherein said outer loop includes said control fins, said adjustment mechanism, said control unit, said wind gust reduction control and said wind sensor.

15. The apparatus of claim 14, further comprising a nominal value generator with a signal output connected to a signal input of said wind gust reduction control.

16. The apparatus of claim 12, wherein said rocket is a multi-stage rocket having a plurality of stages and said control fins are arranged at a transition area between said stages.

17. The apparatus of claim 16, wherein said rocket includes an interstage fairing and said control fins are arranged on said interstage fairing.

* * * * *